United States Patent
Kobayashi et al.

(10) Patent No.: US 7,021,354 B2
(45) Date of Patent: Apr. 4, 2006

(54) CONNECTOR HAVING AIR CONDUCTING STRUCTURE AND SENSOR SYSTEM INCLUDING THE CONNECTOR

(75) Inventors: Akihiro Kobayashi, Aichi (JP); Shinji Kumazawa, Iwakura (JP); Yoshinori Inoue, Komaki (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 10/648,436

(22) Filed: Aug. 27, 2003

(65) Prior Publication Data

US 2004/0077201 A1    Apr. 22, 2004

(30) Foreign Application Priority Data

Aug. 30, 2002  (JP) .............................. 2002-255708

(51) Int. Cl.
   *H01R 3/00*     (2006.01)
(52) U.S. Cl. ............ 156/351; 156/598; 73/23.31; 493/198; 493/190; 123/203
(58) Field of Classification Search ............... 156/351, 156/359, 378, 598; 439/198, 190, 192, 193, 439/194, 191; 123/703; 73/23.31, 23.2
   See application file for complete search history.

(56) References Cited

FOREIGN PATENT DOCUMENTS

| JP | 10-83843 | * | 3/1998 |
| JP | 7-111413 B2 | | 11/1998 |
| JP | 2002-71640 A | | 3/2002 |

* cited by examiner

*Primary Examiner*—Linda Gray
(74) *Attorney, Agent, or Firm*—Sughrue Mion, PLLC

(57) ABSTRACT

Air conducting connector with simplified wiring layout and water-proofing. Connector 2 has air conduction path 3, having a first opening 3a and a second opening 3b. A heater wire 5, air conducting wire and terminal 6 of ECU side are inserted into the first opening 3a, while an air-conducting heater wire 7 and terminal 8 of sensor side are inserted into second opening 3b. Within the air conduction path 3, the ECU side terminal 6 and the sensor side terminal 8 are electrically interconnected. First opening 3a is sealed with resin. The rear part of the air conduction path 3 is sealed with a sealing material 8b. The sensor side terminal 8 and the ECU side terminal 6 are electrically interconnected on insertion to communicate an air conducting part of the sensor side heater wire 7 with an air conducting part of the ECU side heater wire 5 through air conduction path 3.

10 Claims, 7 Drawing Sheets

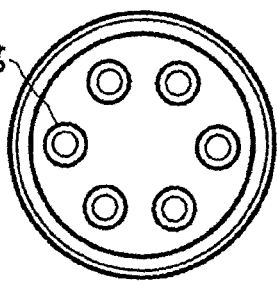
FIG. 7C
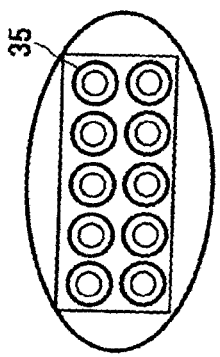
FIG. 7D
FIG. 7B
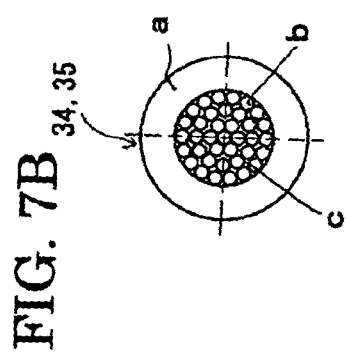
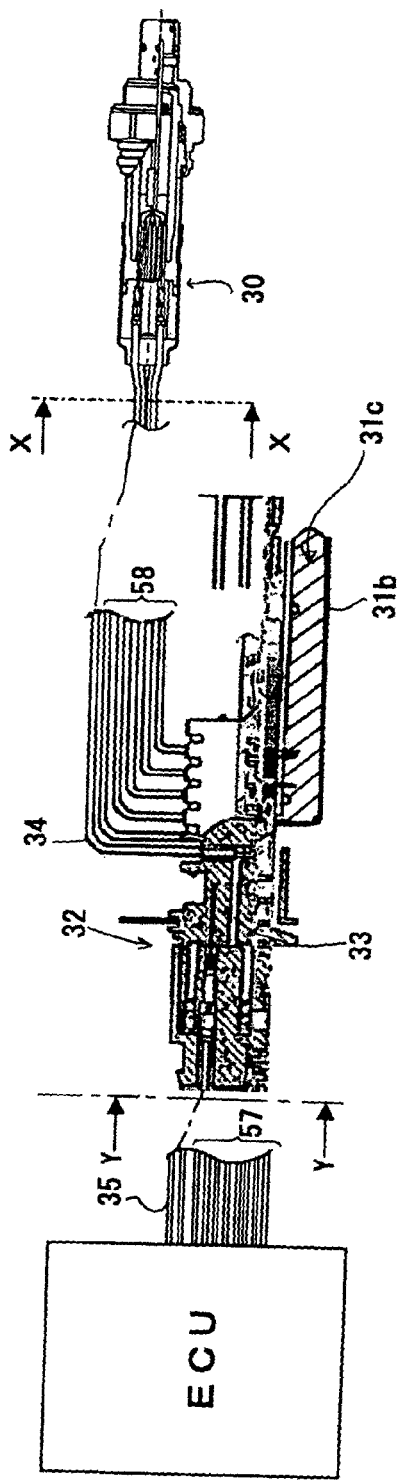
FIG. 7A

US 7,021,354 B2

CONNECTOR HAVING AIR CONDUCTING STRUCTURE AND SENSOR SYSTEM INCLUDING THE CONNECTOR

FIELD OF THE INVENTION

This invention relates to a sensor system having an air conducting structure and in particular to a sensor system mounted on a car for detecting specified components in e.g. engine exhaust gases. More particularly, it relates to such sensor system having a sensor exposed to a negative pressure generated as a result of the operations of the internal combustion engine, and to a connector having an air conducting structure.

BACKGROUND

Among car-laden sensors, there is such a sensor into the inside of which atmospheric air is introduced in order to prevent a space around the sensor from being subjected to a negative pressure to apply a load to a sensor, as a result of operations of the internal combustion engine.

There are some examples in the prior art which shows the connection between a gas sensor and a sensor controller or ECU, such as JP-07-111413B and JP-P2002-71640A. However, no consideration is given in these documents on the problem of intrusion of water into the inside of the sensor due to the negative pressure.

In the prior art there is a sensor in which atmospheric air is introduced into the sensor through a lead wire when the internal of the sensor is at a negative pressure caused by rapid or drastic change in the temperature. Also there is one example in the prior art in which a small bore is provided on a controller case so as to allow the lead wire and sensor to communicate with atmospheric air.

DISCLOSURE OF INVENTION

However, the controller is usually disposed in a state exposed to the external atmosphere outside the vehicle body and apt to intrusion of water. In order to avoid such failure, the bore of the controller case is provided with a fitter to prevent the water from intrusion.

FIG. 4 schematically shows another example of the prior art in which a lead wire is used for eliminating the sensor from such negative pressure. Among a plurality of wires, one wire is passed through a controller case without communicating with the interior of the casing (i.e., electrically by-passing the controller circuit board) and directly connected to the sensor (block thick line). The interior of this lead wire is air conductive and secures an air conduction path between the ECU and the sensor. However, this type of connector renders a complicated layout of lead wires, counted as a drawback.

Thus, there is much desired to eliminate drawbacks in the art.

SUMMARY OF THE DISCLOSURE

It is an object of the present invention to provide a sensor system and a connector having a novel air conducting structure. It is a more specific object of the present invention to provide a sensor system and a connector in which the air conducting structure and wiring layout are simplified and in which water-proofing may be improved. According to the present invention, the object is achieved by the solutions described below.

A basic idea of the present invention resides in a connecting structure in which the interior of a sensor communicates with the atmospheric air only through a lead wire simultaneously with electrical connection via the lead wire through which the sensor and sensor controller (these two being exposed to the external atmosphere outside the vehicle body) and ECU (usually disposed within the vehicle body or chamber). By this structure, water is prevented from intruding the interior of the sensor at a reduced pressure. In the present invention, there is an idea that air communication should be established from the ECU disposed in a vehicle chamber free of water intrusion to the sensor via the lead wire(s) and the controller.

The lead wire is spacially cut off at (and by the presence of) the controller (of a water proof type for protecting electric circuitry) which is interposed between ECU and the sensor. The controller is sealed from the exterior by a seal material such as urethane resin after mounting a circuit board that controls electric signals supplied by lead wires. Thus as for the controller structure, it becomes necessary to provide an air conductive channel which communicates atmospheric air both to a lead wire on the ECU side and a lead wire on the sensor side. The present invention provides a concrete solution for meeting this need.

FIG. 5 illustrates a basic concept of one aspect of the present invention. As compared to the prior art of FIG. 4, it is structured such that the air conductive lead wire is cut into two wire sections at the connector, while the air conductive path and the electrical conductive path are secured via the connector. Regular lead wires which constitute the electric conductive path and the air conductive lead wire may be present in plural, respectively.

In one aspect, the present invention provides a sensor system having a sensor, an engine controlling unit (ECU) mounted in an atmosphere communicating with atmospheric air, a sensor controller, and a heater disposed associated with the sensor and supplied with power from the ECU side for heating the sensor. The sensor system comprises a connector forming a part of the sensor controller, an air conductive sensor side heater wire having one end connected to the heater, a sensor side terminal connected to the other end of the sensor side heater wire and inserted into the connector, an air conductive ECU side heater wire having one end connected to the ECU, an ECU side terminal connected to the opposite end of the ECU side heater wire and inserted into the connector, and a sealing unit for hermetically sealing a spacing defined between the sensor side heater wire and the connector and a spacing defined between the ECU side heater wire and the connector, in a state the sensor side terminal and the ECU side terminal have been inserted into the connector, to form a closed space as an air conduction path.

The sensor side terminal and the ECU side terminal are electrically interconnected for electrically interconnecting the ECU and the heater, whereby an air conduction part of the sensor side heater wire is in communication through the air conduction path with an air conducting part of the ECU side heater wire to supply atmospheric air from the ECU to the sensor element.

In the above sensor system, the sensor side heater wire can be in communication with atmospheric air in the air conduction path where the sensor side terminal and the ECU side terminal are electrically connected to each other, as a result of which atmospheric air may be supplied towards the sensor. With this sensor system, the air conduction path and the electrical connection path can be integrated within the connector, at the same time as the air conduction path may be used common in the connector as the electrical connection path, so that the air conduction structure and the wiring layout can be simplified to provide for improved waterproofing. Moreover, with the sensor system, the number of sites of electrical connection necessary in order to supply power to the heater can be reduced.

In a second aspect, the present invention provides a sensor system wherein the sensor side terminal and the ECU side terminal are of a male-female type connection structure and wherein, when the terminals are electrically connected by insertion for male/female engagement, an air conducting part (area) of the sensor side heater wire and an air conduction part (area) of the ECU side heater wire are in communication with each other through void formed in the connector, i.e., a spacing between connecting sections of the terminals, and/or a spacing between the sensor side terminal and the connector and/or a spacing between the ECU side terminal and the connector.

In a third aspect, the present invention provides a sensor system wherein an electrical conducting section including a first branched section electrically connected to a sensor control board neighboring to the connector, a second branched section electrically connected to the sensor side terminal and a third branched section electrically connected to the ECU side terminal is provided within the connector. According to this system, it is possible to supply the heater with the electric power from the sensor controller side.

In a fourth aspect, the present invention provides a connector comprising an air conductive first wire, a first terminal connected to the first wire, an air conductive second wire, a second terminal connected to the second wire, and a sealing section for hermetically sealing a spacing between the first and second wires for defining a closed space termed as "air conduction path". The first terminal and the second terminal are electrically connected to each other to interconnect the first and second wires electrically, at the same time as communication is established between an air conducting part of the first wire and an air conducting part of the second wire through the air conduction path.

In a fifth aspect, the present invention provides a connector wherein the terminal of the first wire and the second terminal are of a male-female type connection structure, and wherein, when the terminals are electrically connected by insertion to establish male/female engagement, an air conducting part of the first wire and an air conduction path of the second wire are in communication with each other through void formed in the connector, i.e., a spacing between connecting sections of the terminals, and/or a spacing between the first terminal and the connector and/or a spacing between the second terminal and the connector.

The connector may further comprise first and second connector parts hermetically engaging each other, wherein the first connector part receives the first terminal hermetically sealed from the exterior, and the second connector part receives the second terminal hermetically sealed from the exterior. The first and second connector parts may be of a male/female engaging structure and the first and second terminals may be of a male/female engaging structure. The first and second terminals may be directly connected within the connector, or indirectly connected through an electrical connecting line and the air conduction path formed within the connector. The air connection path may be formed across the first and second connector parts within the connector. The at least a sealing may be disposed adjacent to the first or second terminal. The air conduction path may be made up of at least two sections, the first section extending along an axis of the connector, with the second section intersecting the first section. The second section may extend transverse to the connector with one end thereof being open for receiving any one of the terminals of wires, the other end thereof being closed or sealed from the exterior. The terminal should have a structure that allows electrical connection between the wire and a counter-partner of the terminal and air communication between the interior of the wire and the air conduction path. The first and second connector parts may be of a male and female engaging structure, the second connector part having a bore receiving the second terminal hermetically sealed from the exterior by a sealing, the bore inside this sealing forming a part of the air conduction path. The bore extends through a protrusion disposed within an opening formed in the first connector part, the opening forming a part of the air conduction path and being hermetically sealed by a sealing interposed between the first and second connector parts. The connector may further comprise at least one electrically connecting terminal, usually several or more terminals as a multi-pin type connector.

According to a sixth aspect, there is provided a connector system for establishing electric and air connection between at least two wires that allow conduction of electric and air, termed herein as "air conductive wires". The system comprises: first and second air conductive wires having first and second terminals connected to the first and second air conductive wires, respectively; a connector assembly for establishing electric and air connection between the air conductive wires; the connector assembly being configured so as to establish an air conduction path hermetically sealed from the exterior. In the connector system, the system further comprises: sealing means for hermetically sealing a spacing between the air conductive wires formed within the connector assembly, so as to receive the terminals within the sealed spacing; the electric connection between the terminals being direct or indirect; the air connection being established via the sealed spacing serving as air conduction path within the connector assembly. Typically, the first air conductive wire is adapted for air-conductively connecting to a sensor, the second air conductive wire is adapted for connecting to an engine control unit under electric and air connection. The connector assembly is connected under electric and air connection to a control unit for the sensor. The system may further comprise at least one (several or more) electric wire other than the first and second air conductive wires, the at least one electric wire (several wires) and the air conductive wires together making up a harness.

According to a seventh aspect, there is provided a connector and sensor assembly comprising: the connector system according to previous aspect, and a sensor connected to the first air conductive wire, wherein the connector is further connected with a sensor control unit under electric and air connection. In the connector and sensor assembly the sensor is disposed in a first atmosphere, and the air conduction path is in communication with a second atmosphere different from the first atmosphere. Typically, the first atmosphere is the exterior atmosphere of a motor vehicle (e.g., engine room), and the second atmosphere is an atmosphere with a higher compatibility to the sensor than the exterior atmosphere. The second atmosphere is secured from intrusion of water from the first atmosphere, i.e., generally hermetically sealed from the first atmosphere. The sensor may comprise a gas sensor for measuring gas components including $O_2$, NOx, $H_2O$, $CO_2$, CO, HC, etc., typically exhaust gas.

BRIEF DESCRIPTION OF THE DRAWINGS

FIG. 7A shows an example of a sensor system (sensor and control unit assembly) in a schematic view partially broken and omitted.

FIG. 7B shows an example of a cross section of an air conductive wire.

FIGS. 7C and 7D represent cross sections taken along the lines X—X and Y—Y, respectively, of FIG. 7A.

PREFERRED EMBODIMENTS OF THE INVENTION

Figure 1A:
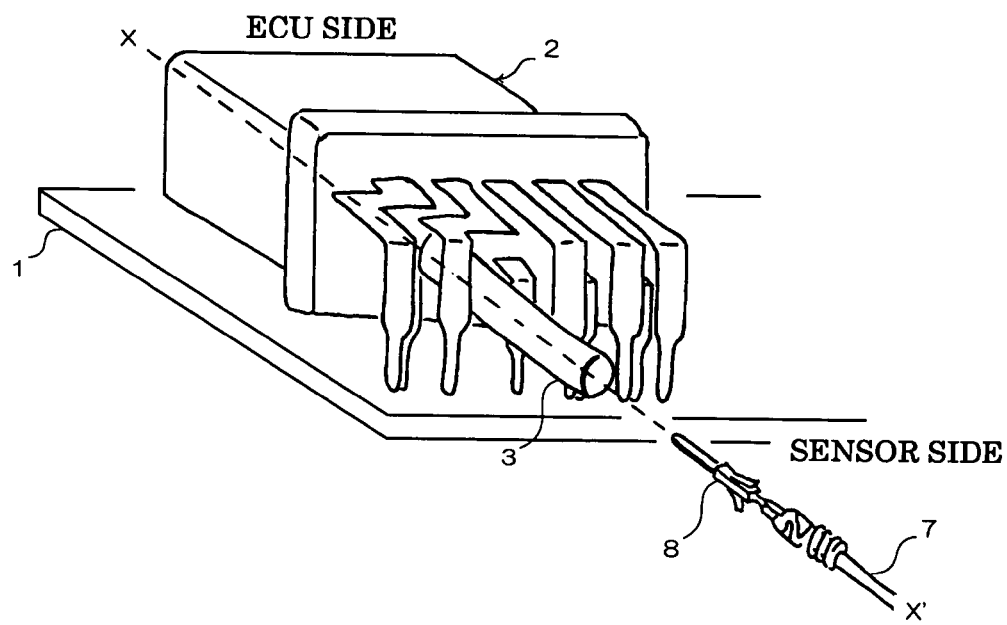
FIG. 1A is an exploded perspective view for illustrating a sensor system and a connector structure of a first embodiment of the present invention and FIG. 1B is a cross-sectional view showing essential sections of FIG. 1A, taken along wire X–X' thereof.

In the following, certain preferred embodiments of the present invention are now explained.

In a preferred embodiment of the present invention, the invention is applied to a system including a sensor for detecting the concentration of specified gases, such as oxygen or NOx, in the exhaust or suction gases including, e.g., $O_2$, NOx, $H_2O$, $CO_2$, CO, HC, etc. in an internal combustion engine.

A sensor system of a preferred embodiment of the present invention includes a sensor, an engine controlling unit (referred to herein as an "ECU") mounted in an atmosphere communicating with atmospheric air, a sensor controller (unit) mounted in an atmosphere that is isolated from atmospheric air, and a heater disposed associated with the sensor and supplied with electric power from the ECU side for heating the sensor by this power. The sensor system comprises a sensor control board, enclosed in the sensor controller, an air conductive sensor side heater wire, electrically connected to the heater, an air conductive ECU side heater wire, electrically connected to the ECU side, a connector mounted on the sensor control board, a sensor side terminal mounted on the sensor side heater wire as a portion of the sensor side heater wire is exposed, and an ECU side terminal mounted on the ECU side heater wire as a portion of the ECU side heater wire is exposed. The ECU side terminal is electrically connected to the sensor side terminal in the connector mounted on the sensor control board. The sensor system also includes an air conduction path, formed in the connector, and within which the sensor side terminal and the ECU side terminal are introduced with void (or gap) and are electrically connected to each other. The side of the air conduction path into which is inserted the ECU side terminal is in communication with atmospheric air via an exposed portion of the ECU side heater wire, while the rear side of a section of the air conduction path into which is inserted the sensor side terminal is sealed.

A sensor system of a preferred embodiment of the present invention includes a sensor, an engine controlling unit (referred to herein as an "ECU") mounted in an atmosphere communicating with atmospheric air, a sensor controller mounted in an atmosphere isolated from the atmospheric air, and a heater disposed associated with the sensor and supplied with power from the ECU side for heating the sensor by this power. The sensor system comprises a sensor control board enclosed in the sensor controller, an air conductive sensor side heater wire, electrically connected to the heater, an air conductive ECU side heater wire, electrically connected to the ECU side, a connector mounted on the sensor control board, and an ECU side terminal mounted on the ECU side heater wire under a state a portion of the ECU side heater wire is exposed. The ECU side terminal is electrically connected to the sensor side terminal within the connector mounted on the sensor control board. The sensor system also includes a wiring formed on the sensor control board and which is electrically connected to the ECU side terminal either directly or indirectly, an opening formed in the connector and into which the ECU side terminal is introduced and sealed, and an air conduction path formed in the connector so as to be in communication with the opening. In the air conduction path, an exposed portion of the sensor side heater wire is inserted. In the air conduction path, a terminal electrically connected to the wiring is protruded, and the exposed portion of the sensor side heater wire and the terminal are electrically connected to each other. The sensor side heater wire is in communication with atmospheric air through the partially exposed portion of the ECU side heater wire, the opening, the air conduction path and the partially exposed portion of the sensor side heater wire to supply atmospheric air to the sensor. With this sensor system, the sensor side heater wire communicates with atmospheric air through the partially exposed portion of the ECU side heater wire, the opening, the air conduction path and the sensor side heater wire to supply atmospheric air to the sensor. With this sensor system, in which the air conduction path and the electrical connection path are integrated within the connector, it is possible to simplify the air conduction structure and wiring layout together with improved water-proofing.

In the sensor system of a preferred embodiment of the present invention, there is provided an air conduction path into which a first terminal, mounted on an air conductive first wire as a portion of the first wire is exposed, and a second terminal, mounted on an air conductive second wire as a portion of the second wire is exposed, may be inserted with a preset void. Within the air conduction path, the first and second terminals are electrically connected to each other, while the gas (or air) may be supplied from the first wire to the second wire via the above preset void in the air conduction path.

In the sensor system of a preferred embodiment of the present invention, there are provided an opening into which is inserted the first terminal, mounted on the air conductive first wire as a portion of the first wire is exposed, and an air conduction path, into which is inserted the second terminal, mounted on the air conductive second wire as a portion of the second wire is exposed. Within the air conduction path, the second terminal is electrically connected to a terminal on the board electrically connected to the first terminal, in order to supply a gas from the first wire to the second wire (or in a reverse direction) via the opening and the air conduction path (that is, the interiors of both the first and second wires are interconnected each other). Usually, the air conduction path may be formed as a closed space sealed from the exterior or atmospheric air by mounting or assembling the connector to a pre-determined unit (case or housing). However, the air conduction path may be formed by sealing such that a closed space may be formed within the connector body itself.

EXAMPLES

For elucidating the preferred embodiments of the present invention, described above, certain specified examples of the present invention are now explained by referring to the drawings.

First Example

Figure 1B:
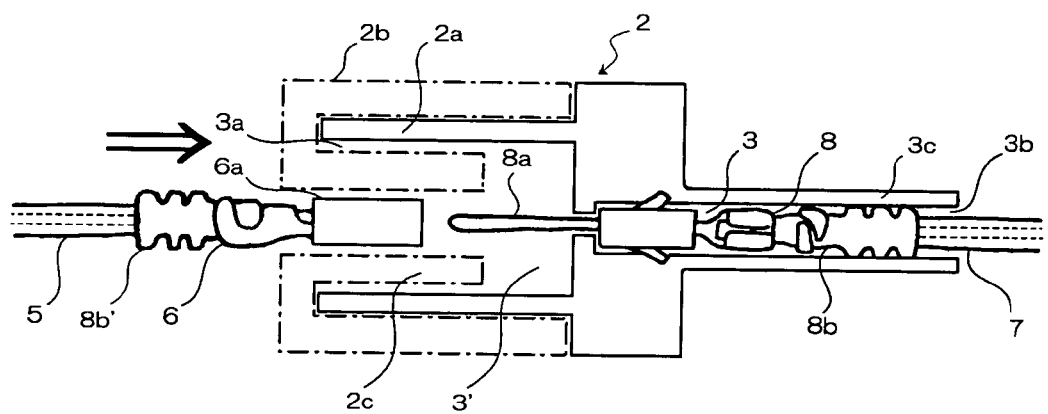

FIG. 1A is an exploded perspective view for illustrating a sensor system and a connector structure of a first embodiment of the present invention. FIG. 1B is a cross-sectional view taken along a wire X–X' of FIG. 1A.

Referring to FIGS. 1A and 1B, a connector 2 is mounted in an electrically connected state on a sensor control board 1, enclosed in a sensor controller, not shown, adapted for controlling a sensor, also not shown. Within the connector 2, an air conduction path 3, having a first opening 3a and a second opening 3b, is formed. Into this air conduction path 3, there are inserted, from the side of the first opening 3a, an ECU side heater wire 5 and an ECU side terminal 6, while there are also inserted, from the side of the second opening 3b, a sensor side heater wire 7 and a sensor side terminal 8. The ECU side heater wire 5 and the sensor side heater wire 7 are designed to be air conductive. The ECU side terminal 6 is engaged with a wall surface encircling the air conduction path 3. Within the air conduction path 3, the ECU side terminal 6 and the sensor side terminal 8 are electrically interconnected via an electrically conductive member (female type) 6a and a mating electrically conductive member (male type) 8a. After this electrical connection is established, a section towards the opening 3a of the air conduction path 3 is sealed with a resin, not shown. A rear section of the air conduction path 3, that is, the opening 3b side of the air conduction path 3, is sealed with a sealing material 8b, caulked to the sensor side heater wire 7 by a sensor side terminal 8. As the sensor side terminal 8 and the ECU side terminal 6 have been introduced into the inside of the connector 2, the spacing between the sensor side heater wire 7 and the connector 2 and the spacing between the ECU side heater wire and the connector 2 are hermetically sealed by these sealing means, that is, the resin sealing the opening 3a and the sealing material 8b, in other words, the interior space in the connector 2, into which the sensor side terminal 8 and the ECU side terminal 6 have been introduced, is hermetically sealed from outside, thus delimiting a closed space (air conduction path 3).

The engagement and sealing of the ECU side terminal 6 against the wall at the side of the first opening 3a may be effected by using a female connector part 2b which outernally engages the male connector part 2a as shown by the dotted broken line. This engagement/sealing may be done by applying a seal material 8b' to a through bore of a guide part 2c similar to the case with the seal material 8b for the second opening 3b.

In the sensor system and the connector structure of the first example of the present invention, a conduction path for atmospheric air from the ECU side to the sensor side is now explained.

The ECU is mounted in an atmosphere communicating with atmospheric air. Thus, atmospheric air is supplied from the ECU to the ECU side heater wire 5, exhibiting air conductivity, and thence into the inside of the opening 3a in the air conduction path 3. Within the air conduction path 3, there have been inserted the sensor side terminal 8 and the ECU side terminal 6. Through this air conduction path 3, atmospheric air is supplied from the ECU side heater wire 5 to the sensor side heater wire 7 and thence supplied from a heater to the spacing around the sensor via the sensor side heater wire 7.

That is, the sensor side terminal 8 and the ECU side terminal 6 are arranged as a male-female type connecting structure and, when these terminals are electrically interconnected on insertion thereof into the connector 2, an air conducting part of the sensor side heater wire 7 is in communication with an air conducting part of the ECU side heater wire 5 through the spacing between connecting portions of the terminals 6, 8 and/or the spacing between the sensor side terminal 8 and the connector 2 and/or the spacing between the ECU side terminal 6 and the connector 2.

In the sensor system and the connector structure according to the first example of the present invention, the air conducting path 3 and the electrical connecting path may be integrated within the connector 2, while the air conducting path and the electrical connecting path are formed common within the connector, with the result that the air conducting structure and the wiring layout may be simplified, while the water-proofing may be improved. Moreover, in the sensor system and the connector structure according to the first example of the present invention, the number of junction points of electrical connection, necessary for supplying the power to the heater, may be reduced.

The present invention is not limited to the above-described example. For example, although it is stated in the first example that the first opening 3a of the connector 2 is sealed, a further connector, for example, may be inserted into this part and a sealing material for the ECU side terminal 6 (a member similar to 8b) may be inserted into this further connector to seal the rear part of the further connector.

One example of such case is shown by the dotted broken line in FIG. 1B. A female connector part 2b that engages a male connector part 2a of the connector 2 has a bottom wall and a tubular part 3c which is inserted into the first opening. The center bore of the tubular part 2c is sealed by a seal material 8b' of the air conductive terminal 6. In this case, the interior of the first opening 3a becomes a closed space through which the air conductor wires both on the sensor side and the ECU side are air-conductively and electrically connected to each other. As shown in FIG. 1A, this connector is of multiple-pin type and may comprise in parallel a plurality of terminals of wires. In the example shown, the connector structure has only one air conductive wire, which may allow a plurality of air conductive wires upon need.

Second Example

The foregoing description of the first example should be referred to insofar as the system of the second example has a structure in common with the sensor system of the first example.

Figure 2A:
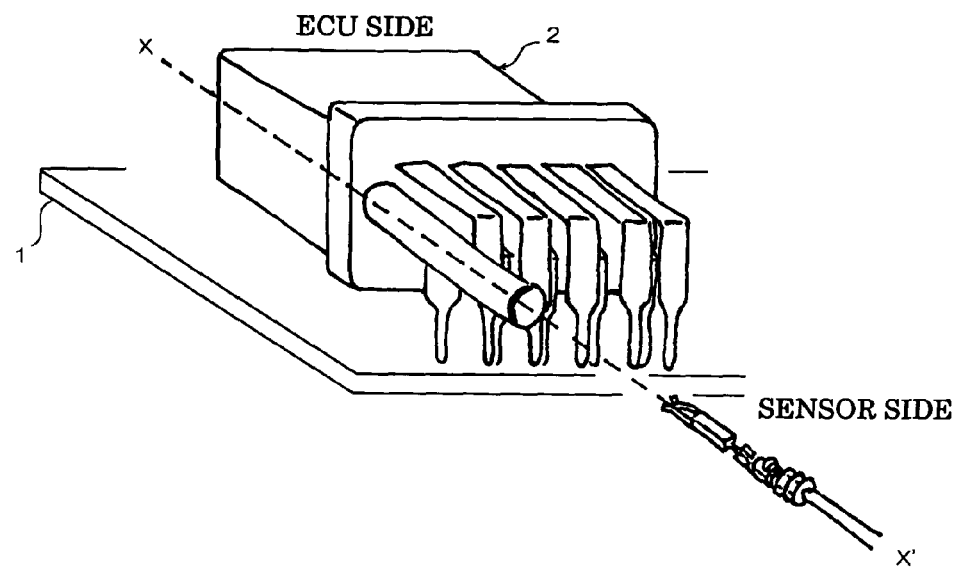
FIG. 2A is an exploded perspective view for illustrating a sensor system and a connector structure of a second embodiment of the present invention and FIG. 2B is a cross-sectional view showing essential sections of FIG. 2A, taken along wire X–X' thereof.
Figure 2B:
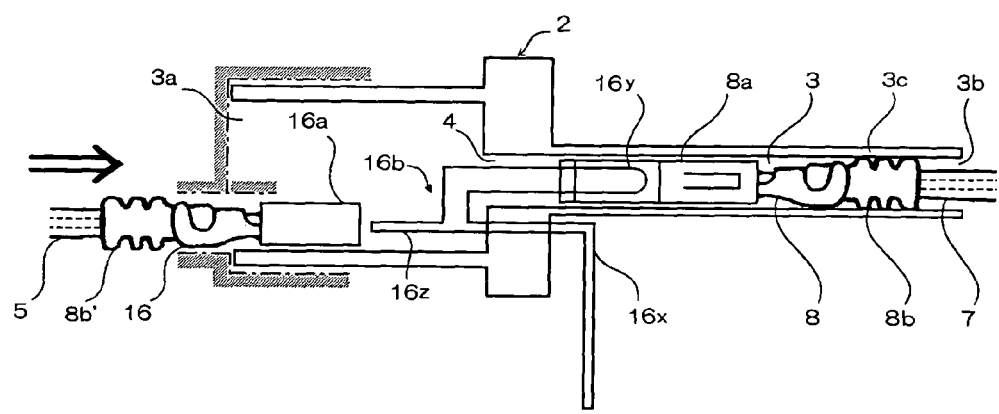

FIG. 2A is an exploded perspective view for illustrating the sensor system and the connector structure of the second example of the present invention. FIG. 2B is a cross-sectional view taken along wire X–X' of FIG. 2A for showing essential sections thereof.

Referring to FIGS. 2A and 2B, there is connected, to a first conducting unit 16a of an ECU side terminal 16, a second conducting unit 16b, including a first branched section 16x, electrically connected to the sensor control board 1, neighboring to the connector 2, a second branched section 16y, electrically connected to the electrically conductive member (male type) 8a of the sensor side terminal 8, and a third branched section (male type) 16z, electrically connected to the first conducting unit (female type) 16a of the ECU side terminal 16.

In the present example, the power can be supplied to the heater from the first conducting unit 16a, that is, from the sensor control board 1.

The present invention is not limited to the above-described examples. For example, although it is stated in the above examples that the first opening 3a of the connector 2 is sealed, a further connector, for example, may be inserted into this area and a sealing material for the ECU side terminal 16 (a member similar to 8b) may be inserted into this further connector to seal the rear part of the further connector.

An example of such female connector is shown by the dotted broken line. The first opening 3a can be sealed to form an interior closed space within the connector by a seal material 8b' disposed downstream (viewed from the terminal end) of the air conductive terminal 16. The interior closed space may be common through the other terminals as shown in FIG. 2A, which, however may be also separated and isolated from the other terminals.

Third Example

The foregoing description of the first example should be referred to insofar as the system of the third example has a structure in common with the sensor system of the first example.

Figure 3:
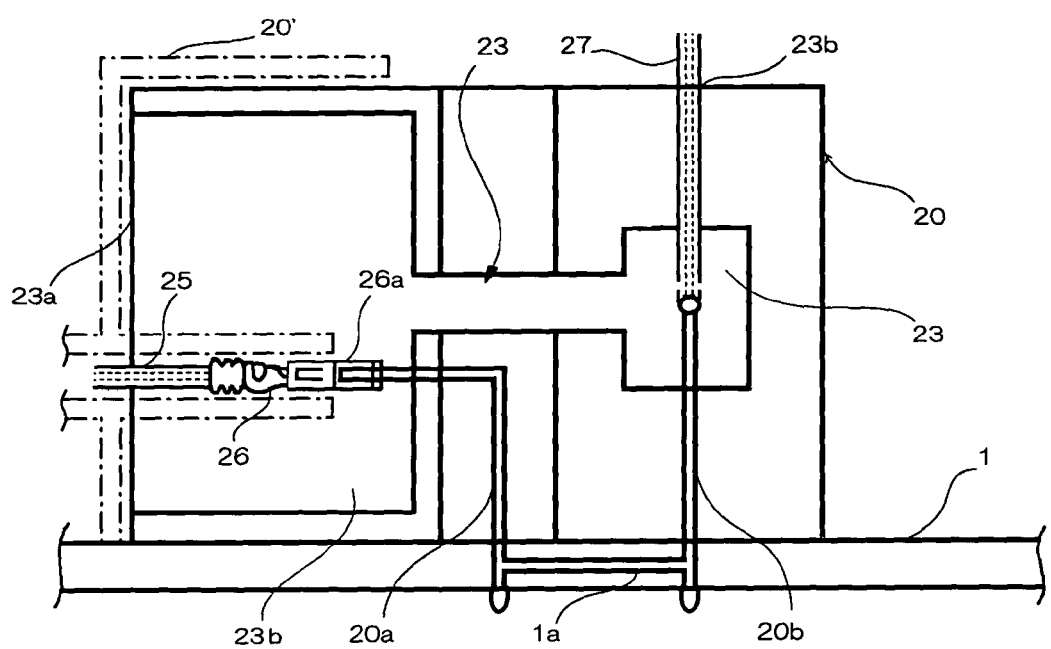
FIG. 3 is a schematic view for illustrating a sensor system according to a third embodiment of the present invention.
Figure 4:
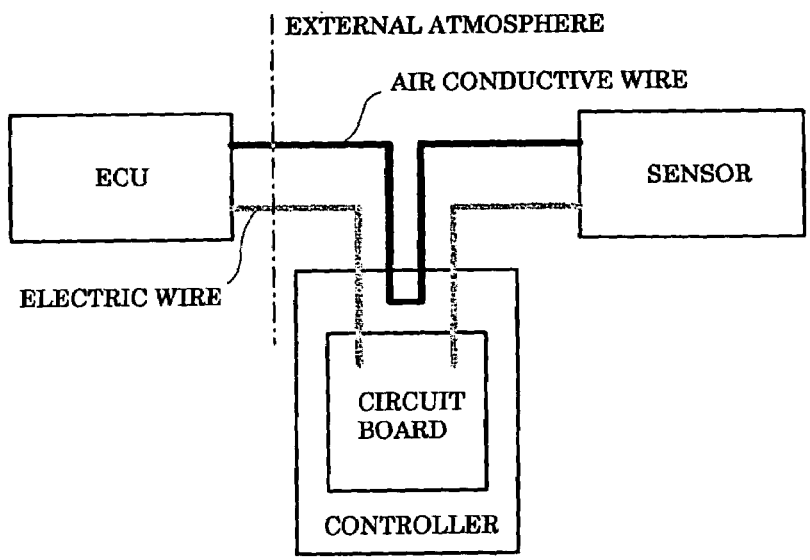
FIG. 4 is a block diagram schematically illustrating the layout of the air conductive wire according to the prior art.

FIG. 3 is a schematic view for illustrating the sensor system and the connector structure of the third example of the present invention.

Referring to FIG. 3, a connector 20 is mounted, in an electrically connected state, on a sensor control board 1, which is enclosed in a sensor controller, not shown, adapted for controlling a sensor, also not shown. Within the connector 20, there is defined an air conduction path 23 having a first opening 23a and a second opening 23b. The first opening 23a and the second opening 23b are sealed. Into this air conduction path 23, there are inserted, from the side of the first opening 23a, an ECU side heater wire 25 and an ECU side terminal 26, while there is also inserted, from the side of the second opening 23b, a sensor side heater wire 27. The ECU side heater wire 25 and the sensor side heater wire 27 are designed to be air conductive (termed "air conductive wire"). On the sensor control board 1, there is formed a wiring 1a electrically connected via a first terminal 20a to an electrically conductive unit 26a of the ECU side terminal 26, while the sensor side heater wire 27 is caulked to a second terminal 20b. Thus, a patterned wiring 1a is electrically connected to the sensor side heater wire 27 within the air conduction path 23. Within the air conduction path 23 (at its part of an enlarged diameter 23'), the sensor side heater wire 27 is inserted, while the second terminal 20b, electrically connected to the wiring 1a, is protruded, and an exposed section of the sensor side heater wire is electrically connected to the second terminal 20b.

The conduction path of the atmospheric air, supplied from the ECU side to the sensor side, in the sensor system and the connector structure of the third example of the present invention, is hereinafter explained.

In the sensor system and the connector structure of the third example of the present invention, the sensor side heater wire 27 communicates with the atmosphere via ECU side heater wire 25 disposed on the atmospheric air side, air conduction path 23 and the sensor side heater wire 27, so that atmospheric air is supplied to the sensor side. With the present sensor system and the connector structure, since the air conduction path and the path for electrical connection are integrated in the connector, the air conduction structure and the wiring layout may be simpler to enable an improved water-proofing.

The first opening 23a may be sealed to form a closed space 23b, 23, 23' within the connector, as one example, by a female connector part 20' similarly with Examples 1 and 2.

Figure 5:
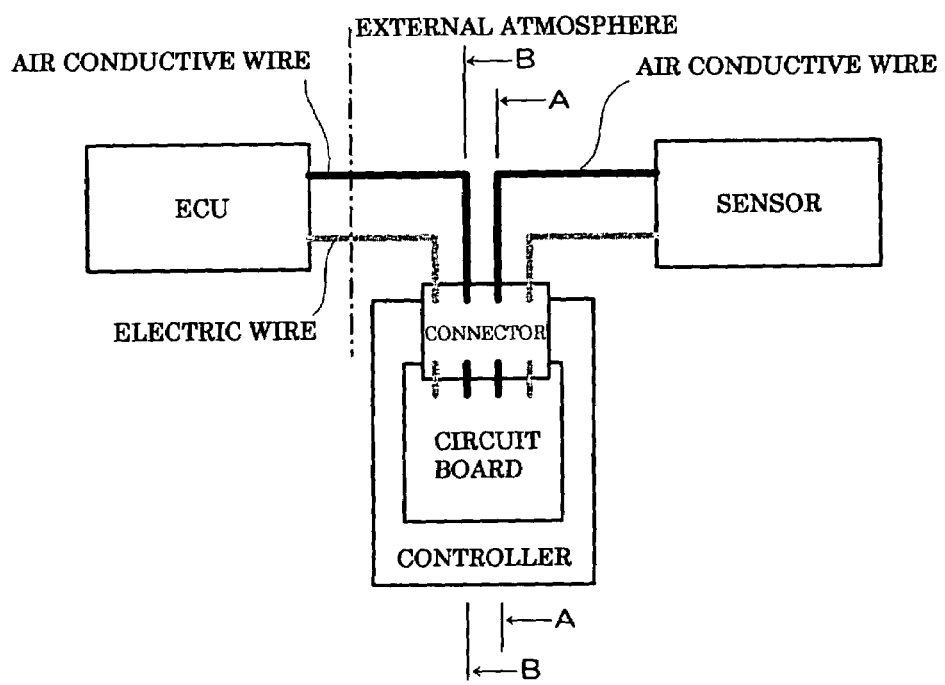
FIG. 5 is a block diagram schematically illustrating one example of a connector according to the present invention.

An example of a connection system for air conductive wires using an air conductive connector is schematically shown in FIG. 5. The air conductive wires are connected on the one hand with the ECU side and on the other hand with the sensor side via the air conductive connector air-conductively as well as electrically. The other electric conductive wire(s) may be connected by the air conductive connector from a controller to ECU on the one hand and the sensor on the other hand in a regular (non-air-conductive) manner.

Figure 6:
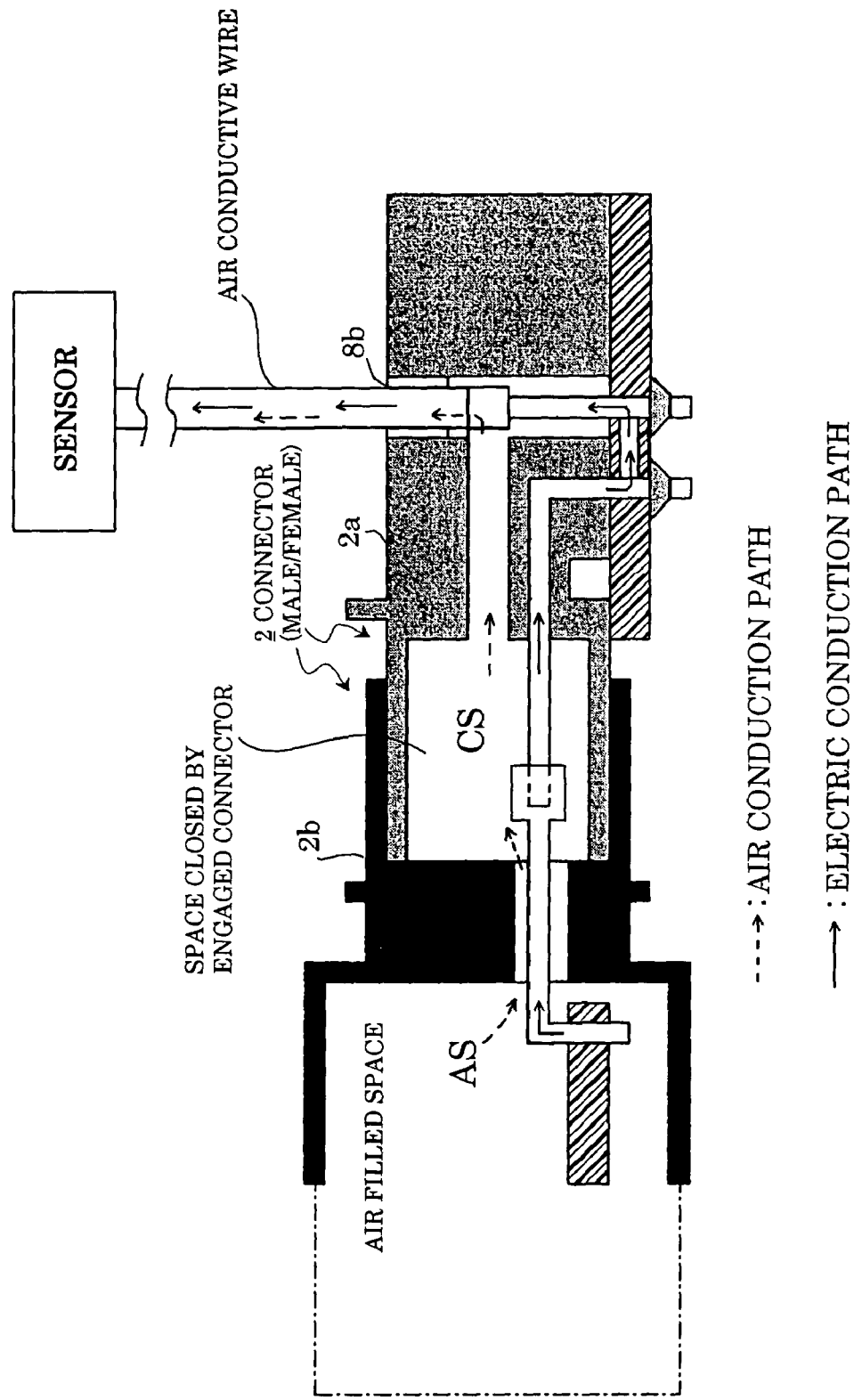
FIG. 6 is a schematic cross sectional view taken along the line A—A (or B—B) of FIG. 5.

In FIG. 6, the cross section along the line A—A of FIG. 5 is schematically shown. The cross section along the line B—B is of the same structure as the cross section A—A provided that the connection is made to ECU instead of the sensor in the cross section A—A.

A connector 2 is made up of a male/female structure in which male and female connector parts 2a, 2b are mutually engaged under hermetic sealing to form a closed space CS within the connector 2. The closed space CS has bores (or channels) communicating to the exterior to form an air conduction path, which is shown by arrows of broken line. The electric conduction path is shown by arrows of solid line. The geographic formulation of the air conduction path and the electric conduction paths is not limited to the illustrated formulation.

The bores disposed within the male connector part 2a extends intersecting in a "T" shape as turned through 90 degrees, one end of the top section of T being open to the exterior, with the other end being closed. Through the open end of the top section of T, an air conductive wire coming from the sensor is sealingly inserted. At the end region of the air conductive wire, an insulation coating is removed to expose core lines to the interior of the bore. The core lines are sealingly connected (e.g., by soldering) to the bore bottom at the extreme end of the core lines on the one hand, and on the other hand electrically connected to a lead line that extends to the controller side in a sealed state. The coating-removed end region of the air conductive wire constitutes an air conductive connection part (terminal) with the air conduction path, thereby providing a communication from the sensor interior to the closed space CS within the connector and a further communication with an inner space AS of a case of the controller unit.

In the Example shown in FIG. 6, the bore extending from the case inner space AS to the closed space CS is in the air conductive state. The electric connecting terminals between the male/female parts of the connector assembly may be of the conventional manner (e.g., insertable plug-in type etc.).

One example of the air conductive wire is a multi-core wire (or cable) coated with an insulating material as shown in FIG. 7B, wherein the void between the core lines forms the air conduction path enabling (axial) air conduction.

The connector 2 is disposed on a sensor control board 1 so as to constitute part of the case of the controller unit when assembled, whereas the female connector part (left side member in FIG. 6) is in communication with the air-filled space AS and electrically with the circuit board disposed in the space AS.

In such a manner, the air conductive connector realizes a connector structure that enables electric and air-connection of the air conductive wires ensuring on the one hand the air conductivity and the electric conductivity on the other hand in the state that isolates and seals any desired apparatus such as a control unit etc. from and against the external atmosphere or any undesired atmosphere (containing harmful ingredients).

Figure 8:
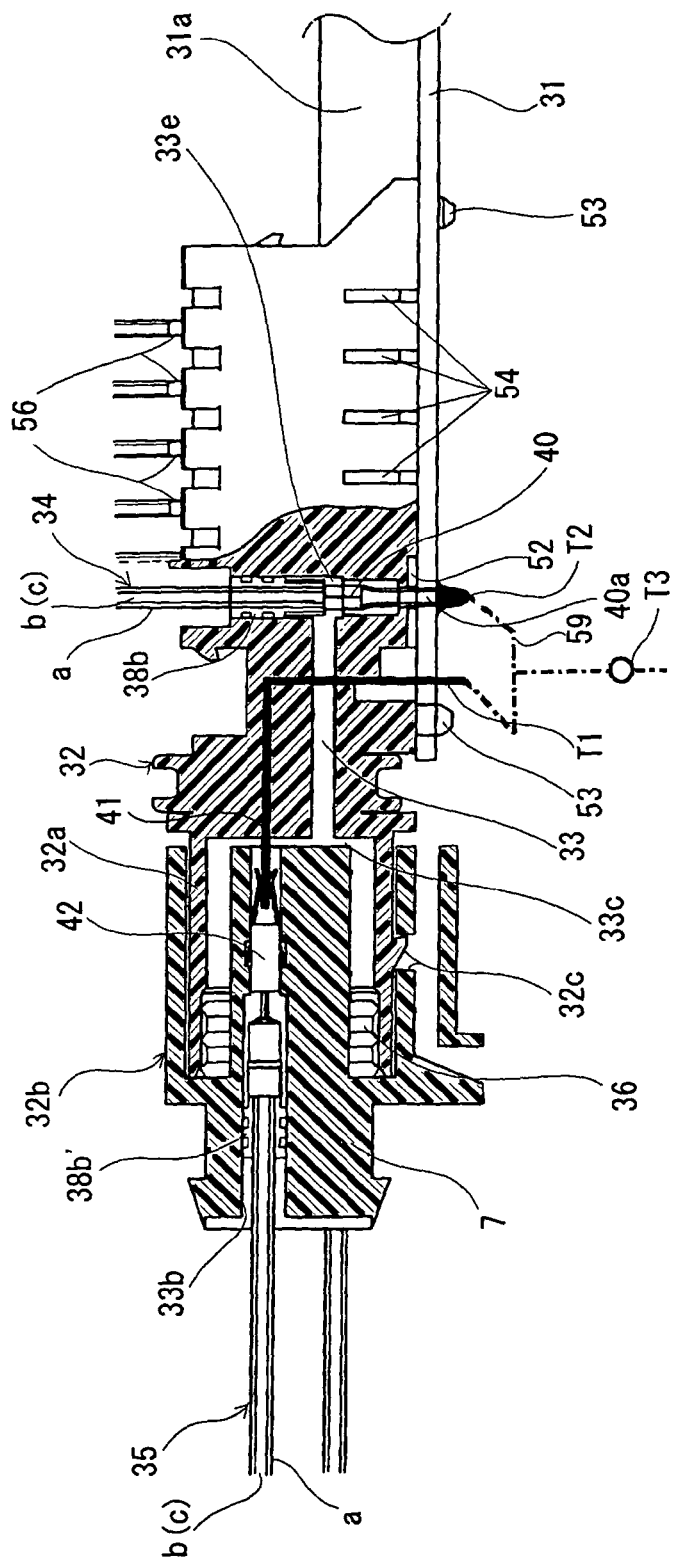
FIG. 8 is a partially broken enlarged view of an embodiment of a connector, e.g., as shown in FIG. 7A.

In FIG. 7 is shown a connection system, as an example of the air and electrical conducting connection system, using an air conductive connector between the ECU and the sensor, and in FIG. 8 an enlarged view of the air conductive connector.

The air conductive connector 32 is made up of male and female connector parts 32a, 32b sealingly engaged with each other. An air conductive lead wire 34 connects an output terminal 40 of the male connector part to the sensor on the one hand, and on the other hand an air conductive lead wire 35 connects the female connector part to the ECU. Thus, both the air conductive lead wires 34, 35 on the ECU and sensor sides are air conductively (termed "airly") connected. An end terminal T2 of the sensor side air conductive lead wire 34 is connected to a power supply terminal T3 at a place outside the figure plane. An ECU side terminal 42, i.e., end of the ECU side air conductive lead wire 35 is engaged with a connector side terminal 41 (connected to terminal T1) disposed within a terminal receiving bore 33b which extends throughout a center protrusion of the female connector part 32b. The ECU side terminal 42 is sealed from the exterior to form a closed space as an air conduction path (33, 33c, 33e) within the connector 32. The ECU side terminal 42 has the air conductive terminal structure to communicate the void c between the core lines b to the air conductive path 33 by removing the coating to expose the core lines b. The air conductive path is established between: terminal—receiving bore 33b—gap 33c between the end of the central protrusion part and the bottom of the first opening—air conductive bore 33—intersecting bore (with enlarged diameter) 33e intersecting at right angles with the air conductive bore 33. This intersecting bore receives the sensor side terminal 40 of the air conductive lead wire of the sensor side wire 34, sealedly from the exterior by a sealing material 38b. An extension part 40a of the terminal 40 form a terminal T2 extending through the circuit board 31 to be sealed retained at the rear surface of the board, e.g., by means of soldering etc.

As a variant, the fixing structure between the terminal extension part 40a and the connector side might be of a detachable structure such as plug-in pin type. However, it is preferred to reduce the number of detachable connection as much as possible. The body of the connector 32 is fixed to the circuit board 31 by a fixing means such as screw bolts or rivets 53.

The electrical connection path by the connector 32 is established by: sensor side lead wire 34—terminal 40—protruded terminal T2 of the conduction part 40a of the terminal/circuit board—connecting line outside the figure plane (dotted broken line) 59—terminal T1—connector terminal lead line 41a—connector side terminal 41 (for connecting to ECU)—ECU terminal 42 connecting to the terminal 41. The line 59 is connected to a power supply terminal T3 (outside the figure plane). Note, however, terminals T1, T2 and T3 may be used for any desired circuit configuration different from ones shown in the figure.

The hermetical sealing of the air conduction path 33 is secured by providing a ring seal material 36 between the male and female connector parts 32a, 32b additional to seal materials 38b, 38b' applied to the intersecting bore and a through bore 33b of the male and female connector parts, respectively, and further sealing the sensor side terminal 40 penetrating through the circuit board 31 with a tape-like seal 52. The entire circuit board 31 is sealed by injecting a water-proof resin (urethane etc.) 31a within a cover 31b (FIG. 7A).

Terminals 56 are disposed on a connector body opposite to the male connector part 32a, a lower part thereof being provided with separated by slits 54 for allowing flow of injected resin. These terminals 56 serve to connect various control lines (sec FIG. 7A) extending to the sensor from the control unit. Engagement between the male and female connector parts 32a, 32b is secured preferably by a lock mechanism 32c.

Next, an example of layout of the various lead lines between ECU—connector (control unit)—sensor is shown in FIG. 7A. There are number of control lines 58 arranged in parallel with a power lead line (electric conductive wire) for supplying electric power to the sensor 30. These lines/wires are connected to the terminals, respectively, of the multi-pin structure under sealing to provide connection between the sensor—connector—control unit, generally, forming a wire harness of a group of wires.

On the other hand, also various control lines 57 are arranged in parallel with the electric conductive wire 35 for power supply, and connected to the respective terminals (of a plug-in type multi-pin connector) disposed outside the figure plane (typically arrayed in a direction normal to the figure plane). Cross sections X—X and Y—Y of sensor side wires and ECU side wires are shown in FIGS. 7C and D, respectively.

As shown in FIG. 7A, the connector 32 is covered with a water-protecting cover 31b (only partially shown) sealed with a water-proof sealing material (urethane resin etc.) 31c to protect the circuit board of the control unit and connector particularly from water intrusion.

FIG. 7B shows an example of a cross section of the air conductive wire (lead line) 34, 35. Insulting coating a (also having water proofness) includes multiple core lines of b extending within the center bore, while providing axial air conductivity through the void c between the multiple core lines. Various variants of the air conductive wire may be used upon need. Particularly in case of the sensor having a heater, its is preferred to use the power wire for supplying electric power as a wire for securing the air conductivity in view of allowable cross sectional area. Such gas sensor includes oxygen sensor, NOx sensor, A/F ratio sensor or other exhaust gas sensors used for controlling combustion engines. However other wire or wires may be used for the same purpose.

FILED OF INDUSTRIAL APPLICABILITY

Typically, the present invention is useful as a connecting means between the sensor-sensor control unit-ECU (engine control unit), however, also for various uses which require electric and air (gas) conductivity. The present invention is applicable to particularly gas sensors, the internal space of which requires gas-communication, e.g., for avoiding occurrence of negative pressure therein. Such sensors include gas sensors, typically exhaust gases, which generally comprise, e.g., $O_2$, NOx, $H_2O$, $CO_2$, CO, HC, etc. In place of the sensor, other equipments which would require gas connection or supply together with electric supply may be connected to the connector via the air (gas) conductive wire or wires. Explanation has been made on water proofness, however, the present invention is likewise applicable to the power supply/electric control system disposed in the harmful or toxic gas atmosphere or as a fire or explosion proof control system used in an atmosphere of explosion risk.

The meritorious effect of the present invention are summarized as follows.

According to the present invention, there are provided a sensor system and a connector having a novel air conduction structure, while there is also provided a sensor system and a connector simplified in its air conducting structure and wiring layout and which may be improved in water-proofing.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

This application is based on Japanese Patent Application No. 2002-255708 filed Aug. 30, 2002, incorporated herein by reference in its entirety.

What is claimed is:

1. A connector system for establishing electricity and air connection between at least two wires that allow conduction of electricity and air, termed herein as "air conductive wires", the system comprising:

first and second air conductive wires having first and second terminals connected to the first and second air conductive wires, respectively;

a connector assembly for establishing electricity and air connection between said air conductive wires;

said connector assembly including sealing means for establishing an air conduction path hermetically sealed from the exterior; and wherein said first air conductive wire is adapted for air-conductivity connecting to a sensor and said second air conductive wire is adapted for connecting to an engine control unit under electric and air connection.

2. The connector system as defined in claim 1, wherein said sealing means comprises means for hermetically sealing a spacing between said air conductive wires formed within said connector assembly, so as to receive said terminals within said sealed spacing;

said terminals being electrically connected either directly or indirectly; and said air connection being established via said sealed spacing serving as air conduction path within said connector assembly.

3. The connector system as defined in claim 1, wherein said connector assembly is connected under electricity and air connection to a control unit for a sensor.

4. The connector system as defined in claim 1, wherein the system further comprises at least one electric wire other than said first and second air conductive wires, said at least one electric wire and said air conductive wires together making up a harness.

5. A connector and sensor assembly comprising:

said connector system as defined in claim 1, and a sensor connected to the first air conductive wire, wherein said connector is further connected with a sensor control unit under electricity and air connection.

6. The connector and sensor assembly as defined in claim 5, wherein said sensor is disposed in a first atmosphere, and said air conduction path is in communication with a second atmosphere different from the first atmosphere.

7. The connector and sensor assembly as defined in claim 5, wherein said first atmosphere is the exterior atmosphere of a motor vehicle, and said second atmosphere is an atmosphere with a higher compatibility to the sensor than the exterior atmosphere.

8. The connector and sensor assembly as defined in claim 7, wherein said second atmosphere is secured from intrusion of water from the first atmosphere.

9. The connector and sensor assembly as defined in claim 5, wherein said sensor comprises a gas sensor for measuring gas components including $O_2$, NOx, $H_2O$, $CO_2$, CO and HC.

10. The connector and sensor assembly as defined in claim 5, further including a sensor controller which is connected to and through said connector under electricity and air conduction with said sensor.

* * * * *